(12) United States Patent
Yang (10) Patent No.: US 9,391,854 B2
(45) Date of Patent: Jul. 12, 2016

(54) METHOD AND ROUTER FOR PACKET PROCESSING DURING SERVER FAILURE

(71) Applicant: HUAWEI TECHNOLOGIES CO., LTD., Shenzhen (CN)

(72) Inventor: Fan Yang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 14/055,117

(22) Filed: Oct. 16, 2013

(65) Prior Publication Data

US 2014/0040466 A1 Feb. 6, 2014

Related U.S. Application Data

(63) Continuation of application No. PCT/CN2011/072971, filed on Apr. 19, 2011.

(51) Int. Cl.
*H04L 12/26* (2006.01)
*H04L 1/22* (2006.01)
*H04L 29/14* (2006.01)
(Continued)

(52) U.S. Cl.
CPC ........ *H04L 43/04* (2013.01); *H04L 1/22* (2013.01); *H04L 69/40* (2013.01); *G06F 11/2005* (2013.01); *G06F 11/2007* (2013.01); *H04L 67/327* (2013.01); *H04N 21/64322* (2013.01)

(58) Field of Classification Search
CPC .......... H04L 43/04; H04L 12/26; H04L 1/22; H04L 69/40; H04L 67/327; G06F 11/2005; G06F 11/2007; H04N 21/64322
See application file for complete search history.

(56) References Cited

U.S. PATENT DOCUMENTS 6,598,071 B1 7/2003 Hayashi et al.
7,168,086 B1 1/2007 Carpenter et al.
(Continued)

FOREIGN PATENT DOCUMENTS

CN 1614930 5/2005
CN 1679294 10/2005
(Continued)

OTHER PUBLICATIONS

Schulzrinne, et al., "rfc3550, RTP: A Transport Protocol for Real-Time Applications", Network Working Group, Jul. 2003, 96 pages.*
(Continued)

*Primary Examiner* — Brian J Gillis
*Assistant Examiner* — Amy Ling
(74) *Attorney, Agent, or Firm* — Staas & Halsey LLP (57) ABSTRACT

Embodiments of the present invention include a method and a router for packet processing during a server failure. In the present invention, a router queries a locally-stored state of a primary value-added service server, thereby immediately learning the state of the primary value-added service server, and when the queried state of the primary value-added service server is a failed state, the router may immediately forward a received request packet to a request routing server for rerouting or forward it to a backup value-added service server, thereby shortening the waiting time of a client when the client requests a video value-added service. In addition, because addresses of backup value-added service servers are stored in the router, disadvantages that client complexity increases and network security is reduced in the prior art are overcome.

11 Claims, 4 Drawing Sheets

(51) Int. Cl.
*G06F 11/20* (2006.01)
*H04L 29/08* (2006.01)
*H04N 21/643* (2011.01)

(56) References Cited

U.S. PATENT DOCUMENTS

| | | | |
|---|---|---|---|
| 8,874,508 B1* | 10/2014 | Mittal | G06F 11/2097 707/610 |
| 2003/0212927 A1 | 11/2003 | Navar et al. | |
| 2004/0225911 A1* | 11/2004 | Smith | G06F 11/2257 714/47.3 |
| 2005/0254504 A1* | 11/2005 | Ozu | H04L 12/2602 370/401 |
| 2007/0198724 A1 | 8/2007 | Hawkinson et al. | |
| 2007/0287454 A1* | 12/2007 | Zhu | H04W 8/10 455/435.1 |
| 2009/0254952 A1 | 10/2009 | Sridhar et al. | |
| 2010/0191858 A1* | 7/2010 | Thomas | H04L 65/1069 709/231 |
| 2011/0307944 A1 | 12/2011 | Jiang et al. | |
| 2012/0166391 A1* | 6/2012 | Liu | H04L 67/1095 707/622 |
| 2012/0166865 A1 | 6/2012 | Liu et al. | |
| 2012/0182995 A1 | 7/2012 | Li et al. | |

FOREIGN PATENT DOCUMENTS

| | | | |
|---|---|---|---|
| CN | 1870536 | 11/2006 | |
| CN | 1878088 | 12/2006 | |
| CN | 1934548 | 3/2007 | |
| CN | 1946058 | 4/2007 | |
| CN | 1997048 | 7/2007 | |
| CN | 101052208 | 10/2007 | |
| CN | 101059807 | 10/2007 | |
| CN | 101068339 | 11/2007 | |
| CN | 101425969 | 5/2009 | |
| CN | 101489260 | 7/2009 | |
| CN | 101610162 | 12/2009 | |
| CN | 101645791 | 2/2010 | |
| CN | 101651691 | 2/2010 | |
| CN | EP 2187302 A1 * | 5/2010 | G06F 3/12 |
| CN | 101981868 | 2/2011 | |
| EP | 2 273 371 A2 | 1/2011 | |
| JP | 2000-49858 | 2/2000 | |
| JP | 2002-169704 | 6/2002 | |
| JP | 2008-209975 | 9/2008 | |
| JP | 2011-519511 | 7/2011 | |
| KR | 10-2010-0137556 | 12/2010 | |
| WO | WO 2009/123688 A1 | 10/2009 | |
| WO | 2010/121649 A1 | 10/2010 | |
| WO | 2011/035713 | 3/2011 | |

OTHER PUBLICATIONS

Japanese Office Action issued on Oct. 28, 2014 in corresponding Japanese Patent Application No. 2014-505478.
PCT International Search Report and Written Opinion of the International Searching Authority dated Jan. 19, 2012 in corresponding International Patent Application No. PCT/CN2011/072971.
Chinese Office Action dated Dec. 31, 2012 in corresponding Chinese Patent Application No. 201180000415.3.
Extended European Search Report issued Mar. 21, 2014, in corresponding European Patent Application No. 11746879.3.
Japanese Office Action dated Apr. 28, 2015 in corresponding Japanese Patent Application No. 2014-505478.
"OIPF Functional Architecture", V2.1, Open IPTV Forum, Mar. 15, 2011, 4 pp., <www.oipf.tv/docs/oipf-archive/OIPF-T1-R2-Functional_Architecture-v2_1-2011-03-15.pdf>.

* cited by examiner

METHOD AND ROUTER FOR PACKET PROCESSING DURING SERVER FAILURE

CROSS-REFERENCE TO RELATED APPLICATIONS

This application is a continuation of International Application No. PCT/CN2011/072971, filed on Apr. 19, 2011, which is hereby incorporated by reference in its entireties.

TECHNICAL FIELD

Embodiments of the present invention relate to the field of network communication technologies, and in particular to a method and a router for packet processing during a server failure.

BACKGROUND

With the development of the communication industry, IPTV (Internet Protocol Television) services are applied more and more extensively. In a conventional IPTV service, problems of video encoding and decoding easily result in slow changing of channels, and a phenomenon of packet loss in a network link easily causes an erratic display or blank screen in video playing. The prior art provides a router to solve these problems, on which a value-added service board is arranged to provide video value-added services. One or more value-added service boards form a value-added service server (also referred to as a value-added service group). The server may perform FCC (Fast Channel Changing) and RET (Retransmission, retransmission of a lost packet), thereby improving user experience for videos.

When a client (that is, a set top box) requests FCC and RET, the client sends a request packet to an RRS (Request Routing Server), the RRS routes a primary value-added service server and forwards the request packet to the primary value-added service server routed by the RRS, and then the primary value-added service server communicates with the client directly.

The RRS maintains state information of all value-added service servers by using a heartbeat packet. The RRS sends a heartbeat packet to a value-added service server every 10 seconds. If the RRS does not obtain a response from the value-added service server for three consecutive times, the RRS considers that the value-added service server fails and changes the locally-stored state of the value-added service server to a failed state. Afterward, if the RRS receives a request from the client again, the RRS does not route the failed value-added service server.

When a value-added service board in the value-added service server fails, at least 30 s is required for the RRS to detect the failure of the value-added service server and reroute the request of the client. In this period of time, if a client sends a request packet to the value-added service server, the client will not receive a response immediately, and as a result, the client needs to wait for a long time when requesting FCC and RET, thereby reducing user experience for videos.

The prior art provides a method for setting backup value-added service servers on a router to avoid a long-time waiting of the client when the client requests FCC and RET. A backup value-added service server is formed by one or more value-added service boards. The client stores addresses of all backup value-added service servers. When the client sends a request packet, the client carries the stored addresses of all the backup value-added service servers in the packet. When a value-added service board in the primary value-added service server routed by the RRS fails, resulting in the failure of the primary value-added service server and inability of responding to the request packet, the primary value-added service server forwards the request packet to a backup value-added service server according to the address of the backup value-added service server carried in the request packet, and the backup value-added service server directly communicates with the client, thereby shortening the waiting time of the client in requesting FCC and RET.

In the process of implementing FCC and RET by the backup value-added service servers, the inventor finds that the prior art has at least the following problems: Because the client needs to know the addresses of all the backup value-added service servers in advance, client complexity increases; in addition, because the addresses of all the backup value-added service servers are exposed in a transmission process of the request packet, network security is reduced.

SUMMARY

Embodiments of the present invention provide a method and a router for packet processing during a server failure, which not only shorten the waiting time of a client when the client requests a video value-added service, but also avoid increasing client complexity and reducing network security.

To achieve the preceding objective, the embodiments of the present invention adopt the following technical solutions:

A method for packet processing during a server failure, including: receiving, by a router, a request packet generated when a client establishes an initial connection or requests FCC and RET, where the request packet carries information about a primary value-added service server in the router; querying, by the router, a locally-stored state of the primary value-added service server according to the information about the primary value-added service server; and when the state of the primary value-added service server is a failed state, forwarding, by the router, the request packet to a request routing server for rerouting; or when the state of the primary value-added service server is a failed state, forwarding, by the router according to a locally-stored address of a backup value-added service server, the request packet to the backup value-added service server.

A router, including: a receiving module, configured to receive a request packet generated when a client establishes an initial connection or requests FCC and RET, where the request packet carries information about a primary value-added service server in the router; a querying module, configured to query a locally-stored state of the primary value-added service server in the router according to the information about the primary value-added service server; and a forwarding module, configured to forward, when the state of the primary value-added service server is a failed state, the request packet to a request routing server for rerouting, where the state of the primary value-added service server is found by the querying module; or the forwarding module, configured to forward, according to a locally-stored address of a backup value-added service server in the router, the request packet to the backup value-added service server when the state of the primary value-added service server is a failed state, where the state of the primary value-added service server is found by the querying module.

According to the method and the router for packet processing during a server failure that are provided in the embodiments of the present invention, the router queries a locally-stored state of a primary value-added service server, thereby immediately learning the state of the primary value-added service server, and when the queried state of the primary value-added service server is a failed state, the router may immediately forward a received request packet to an RRS for rerouting or forward it to a backup value-added service server, and then the rerouted primary value-added service server or the backup value-added service server responds to the request of a client. However, in the prior art, a failure of the primary value-added service server can be detected only through an RRS heartbeat packet, and it takes at least 30 s to confirm the failed state of the primary value-added service server before the RRS can perform rerouting. Therefore, the method and the router for packet processing during a server failure according to the embodiments of the present invention can shorten the waiting time of the client when the client requests a video value-added service.

In addition, according to the method and the router for packet processing during a server failure that are provided in the embodiments of the present invention, because addresses of backup value-added service servers are stored in the router, when the primary value-added service server fails, the router may select an available backup value-added service server and directly forward a received request packet to the selected backup value-added service server. This overcomes disadvantages in the prior art that client complexity increases and network security is reduced, which are resulted from that the addresses of backup value-added service servers are stored on the client.

BRIEF DESCRIPTION OF DRAWINGS

The following briefly introduces the accompanying drawings required for describing the embodiments or the prior art to illustrate the technical solutions in the embodiments of the present invention or in the prior art more clearly. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
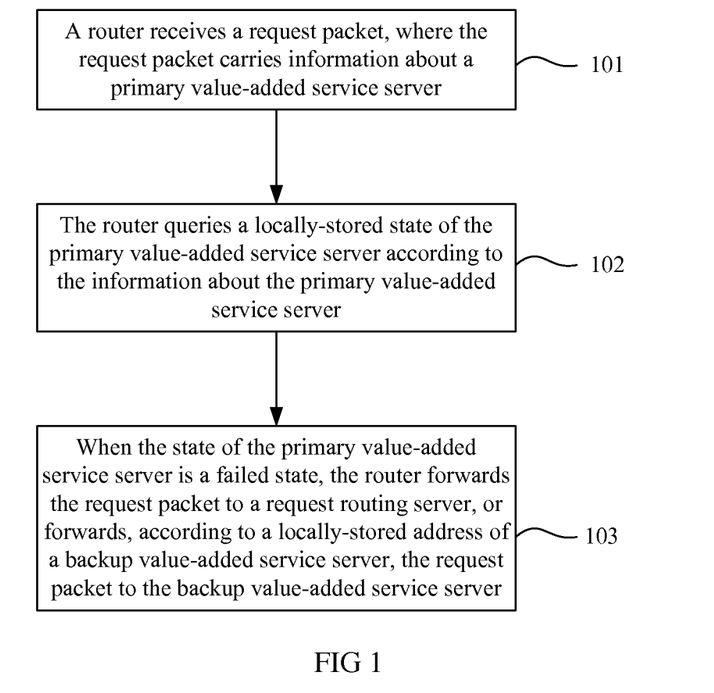
FIG. 1 is a flowchart of a method for packet processing during a server failure according to Embodiment 1 of the present invention.

This embodiment provides a method for packet processing during a server failure. As shown in FIG. 1, the method includes the following steps:

101. A router receives a request packet generated when a client establishes an initial connection or requests FCC and RET, where the request packet carries information about a primary value-added service server in the router.

Specifically, an interface board of the router receives the request packet, where the request packet is generated when the client establishes an initial connection or requests FCC and RET. The request packet may be forwarded from an RRS, or may be directly sent by the client, and the request packet carries information about the primary value-added service server in the router, such as an address of the primary value-added service server. The primary value-added service server is formed by at least one value-added service board on the router.

102. The router queries a locally-stored state of the primary value-added service server according to the information about the primary value-added service server.

A main control board is arranged on the router and is configured to control and manage all value-added service boards on the router, maintain state information of the value-added service boards, and maintain state information of the value-added service server formed by the value-added service boards. The state information is locally stored by the main control board.

The router queries the locally-stored corresponding state of the primary value-added service server according to the information about the primary value-added service server carried in the request packet.

103. When the state of the primary value-added service server is a failed state, the router forwards the request packet to a request routing server for rerouting; or when the state of the primary value-added service server is a failed state, the router forwards, according to a locally-stored address of a backup value-added service server, the request packet to the backup value-added service server.

Specifically, when the router queries that the state of the primary value-added service server is the failed state, the router forwards the received request packet to the request routing server (that is, RRS); the RRS reroutes another available primary value-added service server; and then the RRS forwards the received request packet to the reselected primary value-added service server.

Alternatively, when the router queries that the state of the primary value-added service server is the failed state, the router selects an available backup value-added service server according to the address of the backup value-added service server stored in the router and forwards the received request packet to the selected backup value-added service server.

If the main control board does not detect a failed value-added service board in the primary value-added service server, the main control board confirms that the state of the primary value-added service server is a normal state. Then, the router transmits the received request packet to the primary value-added service server; and the primary value-added service server responds to the request packet and then directly communicates with the client.

According to the method for packet processing during a server failure provided in this embodiment, a router queries a locally-stored state of a primary value-added service server, thereby immediately learning the state of the primary value-added service server, and when the queried state of the primary value-added service server is a failed state, the router may immediately forward a received request packet to an RRS for rerouting or forward it to a backup value-added service server, and then the rerouted primary value-added service server or the backup value-added service server responds to the request of a client. However, in the prior art, a failure of the primary value-added service server can be detected only through an RRS heartbeat packet, and it takes at least 30 s to confirm the failed state of the primary value-added service server before the RRS can perform rerouting. Therefore, the method for packet processing during a server failure according to this embodiment can shorten the waiting time of the client when the client requests a video value-added service.

In addition, in the method for packet processing during a server failure according to this embodiment, because addresses of backup value-added service servers are stored in the router, when the primary value-added service server fails, the router may select an available backup value-added service server and directly forward the received request packet to the selected backup value-added service server. This overcomes disadvantages in the prior art that client complexity increases and network security is reduced, which are resulted from that the addresses of backup value-added service servers are stored on the client.

Figure 2:
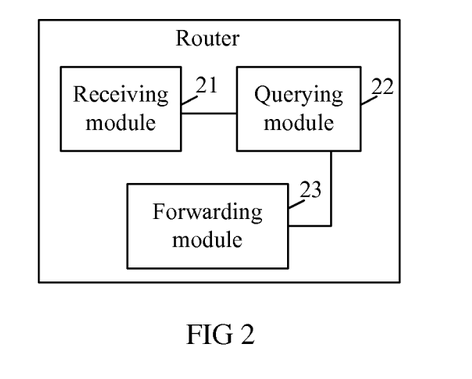
FIG. 2 is a block diagram of a router according to Embodiment 1 of the present invention.

This embodiment further provides a router. As shown in FIG. 2, the router includes: a receiving module 21, configured to receive a request packet generated when a client establishes an initial connection or requests FCC and RET, where the request packet carries information about a primary value-added service server in the router; a querying module 22, configured to query a locally-stored state of the primary value-added service server in the router according to the information about the primary value-added service server; and a forwarding module 23, configured to forward, when the state of the primary value-added service server is a failed state, the request packet to a request routing server for rerouting, where the state of the primary value-added service server is found by the querying module 22; or the forwarding module 23, configured to forward, according to a locally-stored address of a backup value-added service server in the router, the request packet to the backup value-added service server when the state of the primary value-added service server is a failed state, where the state of the primary value-added service server is found by the querying module 22.

The method executed by the modules has been described in detail above, and therefore no further details are provided herein.

The router provided in this embodiment queries a locally-stored state of a primary value-added service server by using a querying module, thereby immediately learning the state of the primary value-added service server, and when the found state of the primary value-added service server is a failed state, the router may immediately forward a received request packet to an RRS for rerouting or forward it to a backup value-added service server. However, in the prior art, a failure of the primary value-added service server can be detected only through an RRS heartbeat packet, and it takes at least 30 s to confirm the failed state of the primary value-added service server before the RRS can perform rerouting. Therefore, the router provided in this embodiment can shorten the waiting time of a client when the client requests a video value-added service.

In addition, in the router provided in this embodiment, because addresses of backup value-added service servers are stored in the router, when the primary value-added service server fails, the router may select an available backup value-added service server and directly forward the received request packet to the selected backup value-added service server. This overcomes disadvantages in the prior art that client complexity increases and network security is reduced, which are resulted from that the addresses of backup value-added service servers are stored on the client.

Embodiment 2

This embodiment provides a method for packet processing during a server failure. This method is a further improvement on the method for packet processing during a server failure in Embodiment 1. The method includes the following steps:

Step 1: A router receives a request packet generated when a client establishes an initial connection or requests FCC and RET, where the request packet carries information about a primary value-added service server in the router.

Step 2: The router queries a locally-stored state of the primary value-added service server according to the information about the primary value-added service server.

Step 3: When the state of the primary value-added service server is a failed state, the router forwards the request packet to a request routing server for rerouting; or when the state of the primary value-added service server is a failed state, the router forwards, according to a locally-stored address of a backup value-added service server, the request packet to the backup value-added service server.

The three steps are the same as those in the method for packet processing during a server failure in Embodiment 1, and therefore no further details are provided herein. The method for packet processing during a server failure according to this embodiment may achieve, through the three steps, the purpose of shortening the waiting time of the client when the client requests a video value-added service. This method may further implement failure feedback and recovery functions of the router through the following steps 301 and 302. The following describes steps 301 and 302 in detail with reference to FIG. 3.

Figure 3:
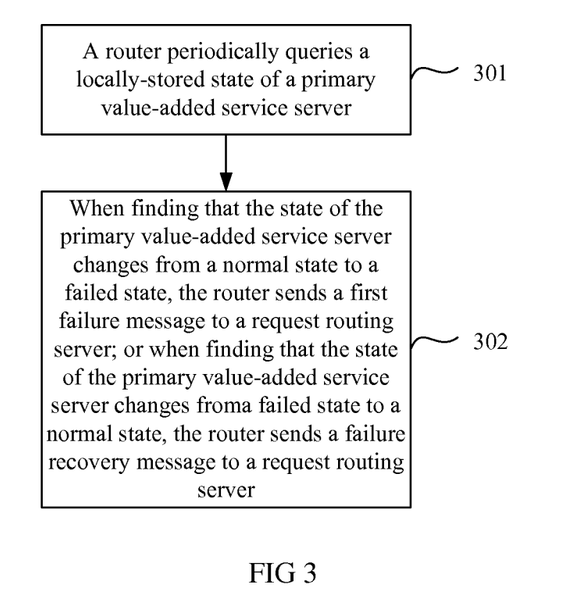
FIG. 3 is a flowchart of a failure feedback process in a method for packet processing during a server failure according to Embodiment 2 of the present invention.

301. The router periodically queries the locally-stored state of the primary value-added service server.

Specifically, the router has a failure feedback function in addition to the functions of receiving a request packet and forwarding a request packet. A main control board on the router stores the state of the value-added service server locally. The router can obtain information of a state change of the primary value-added service server by periodically querying the state of the primary value-added service server in the router.

302. When finding that the state of the primary value-added service server changes from a normal state to the failed state, the router sends a first failure message to the RRS; or when finding that the state of the primary value-added service server changes from the failed state to a normal state, the router sends a failure recovery message to the RRS.

Specifically, when the router finds that the state of the primary value-added service server changes from the normal state to the failed state, the router sends the first failure message to the RRS, where the first failure message is used to instruct the RRS to change the corresponding state of the primary value-added service server stored on the RRS to the failed state. Therefore, during subsequent routing for primary value-added service servers, the RRS does not route the primary value-added service server in the failed state. However, because the failure feedback function is not available in the prior art, after the primary value-added service server fails and before the RRS detects the failure through a heartbeat packet, the request packet of the client is still sent to the failed primary value-added service server, and then the failed server forwards the packet to the backup value-added service server. This increases the burden of the failed server greatly, and a path through which the request packet reaches a server that can respond to the request is also not optimal.

Execution of step 301 and step 302 can solve a problem that a failed value-added service server is still invoked by the RRS in the prior art.

In addition, when the router finds that the state of the primary value-added service server changes from the failed state to the normal state, the router sends the failure recovery message to the RRS, where the failure recovery message is used to instruct the RRS to change the corresponding state of the primary value-added service server stored on the RRS to the normal state. Therefore, during subsequent routing for primary value-added service servers, the RRS can route the primary value-added service server that has recovered to the normal state.

In the above steps, the state of the primary value-added service server is obtained by the main control board on the router through active detection or is obtained by the main control board by receiving a state message reported by the primary value-added service server, and is stored locally by the main control board.

Specifically, after a value-added service server fails, the main control board learns the failure in the following two manners. The failure of the value-added service board generally includes a common failure and a board suspension. When a common failure occurs, the value-added service board immediately notifies the main control board of it, and the main control board changes its stored states of the value-added service board and the value-added service server to which the value-added service board belongs to the failed state. When a board suspension occurs, the value-added service board is unable to notify the main control board of it, and the main control board detects the state of the value-added service board through a heartbeat packet. If the main control board still does not receive a response packet from the value-added service board after sending 12 heartbeat packets (that is, 12 s), the main control board confirms that the value-added service board is suspended, and changes its stored states of the value-added service board and the value-added service server to which the value-added service board belongs to the failed state, and at the same time enables the failed value-added service board to perform a heartbeat loss restart. The router can learn the state of the primary value-added service server in real time through the above query operation.

Certainly, the state change of the primary value-added service server from the failed state to the normal state may include but is not limited to copying, by the router, data of the backup value-added service server to the primary value-added service server. The backup value-added service server and the primary value-added service server are equivalent servers, and they include same information and can provide a same service for the client. Therefore, the failed primary value-added service server can be recovered to the normal state by copying the data on the backup value-added service server to the corresponding failed primary value-added service server.

The method for packet processing during a server failure according to this embodiment is a method improved on the basis of Embodiment 1. It can not only overcome the disadvantages of long-time waiting of a client when the client requests a video value-added service, increased client complexity, and reduced network security, which are overcome in Embodiment 1, but also solve the problems of a burden increase of the failed value-added service server and a non-optimal transmission path of the request packet because the failed value-added service server is still invoked by the RRS.

Figure 4:
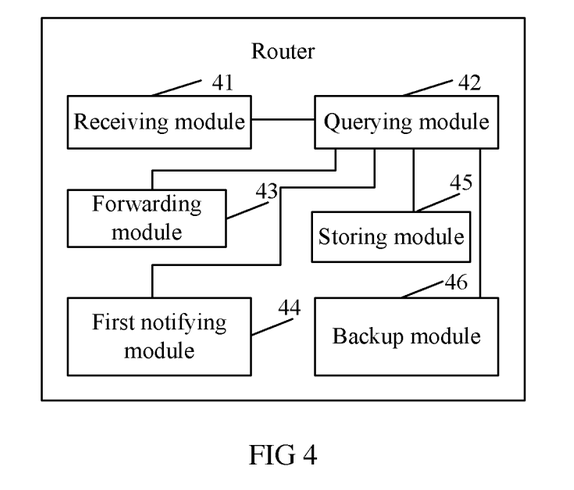
FIG. 4 is a block diagram of a router according to Embodiment 2 of the present invention.

This embodiment further provides a router. As shown in FIG. 4, the router includes: a receiving module 41, configured to receive a request packet generated when a client establishes an initial connection or requests FCC and RET, where the request packet carries information about a primary value-added service server in the router; a querying module 42, configured to query a locally-stored state of the primary value-added service server in the router according to the information about the primary value-added service server; and a forwarding module 43, configured to forward, when the state of the primary value-added service server is a failed state, the request packet to a request routing server for rerouting, where the state of the primary value-added service server is found by the querying module 42; or the forwarding module 43, configured to forward, according to a locally-stored address of a backup value-added service server, the request packet to the backup value-added service server when the state of the primary value-added service server, where the state of the primary value-added service server is found by the querying module 42.

The querying module 42 may be further configured to periodically query the locally-stored state of the primary value-added service server in the router.

The router may further include: a first notifying module 44, configured to send a first failure message to the request routing server when the state of the primary value-added service server changes from the normal state to the failed state, where the state of the primary value-added service server is found by the querying module 42, and the first failure message is used to instruct the request routing server to change the state of the primary value-added service server stored on the request routing server to the failed state.

The first notifying module 44 may be further configured to send a failure recovery message to the request routing server when the state of the primary value-added service server changes from the failed state to the normal state, where the state of the primary value-added service server is found by the querying module 42, and the failure recovery message is used to instruct the request routing server to change the state of the primary value-added service server stored on the request routing server to the normal state.

The router may further include a storing module 45, configured to store the state of the primary value-added service server, where the state of the primary value-added service server is obtained by a main control board on the router through active detection or is obtained by the main control board by receiving a state message reported by the primary value-added service server.

The router may further include a backup module 46, configured to copy data of the backup value-added service server to the primary value-added service server, so that the state of the primary value-added service server changes from the failed state to the normal state.

The method executed by the above modules has been described in detail in Embodiment 1 and the above method description, and therefore no further details are provided herein.

The router provided in this embodiment is a router improved on the basis of Embodiment 1. It can not only overcome the disadvantages of long-time waiting of a client when the client requests a video value-added service, increased client complexity, and reduced network security, which are overcome in Embodiment 1, but also solve the problems of a burden increase of a failed server and a non-optimal transmission path of a request packet, which are resulted from that the failed server is still invoked by an RRS.

Embodiment 3

Figure 5:
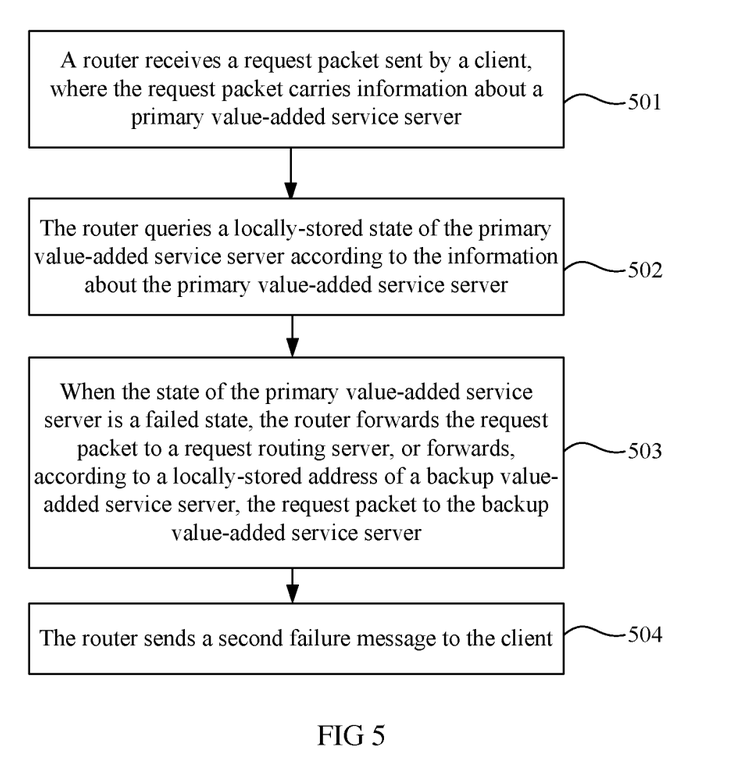
FIG. 5 is a flowchart of a method for packet processing during a server failure according to Embodiment 3 of the present invention.

This embodiment provides a method for packet processing during a server failure. This method is a further improvement on the method for packet processing during a server failure in Embodiment 1. As shown in FIG. 5, the method includes the following steps:

501. A router receives a request packet that is sent by a client and is generated when the client establishes an initial connection or requests FCC and RET, where the request packet carries information about a primary value-added service server in the router.

Specifically, an interface board of the router receives the request packet, where the request packet is generated when the client establishes an initial connection or requests FCC and RET. The request packet is sent by the client, and the request packet carries the information about the primary value-added service server in the router, such as the address of the primary value-added service server. The primary value-added service server is formed by at least one value-added service board on the router.

502. The router queries a locally-stored state of the primary value-added service server according to the information about the primary value-added service server.

503. When the state of the primary value-added service server is a failed state, the router forwards the request packet to a request routing server for rerouting; or when the state of the primary value-added service server is a failed state, the router forwards, according to a locally-stored address of a backup value-added service server, the request packet to the backup value-added service server.

The three steps are the same as those in the method for packet processing during a server failure in Embodiment 1, and therefore no further details are provided herein.

504. The router sends a second failure message to the client.

Figure 6:
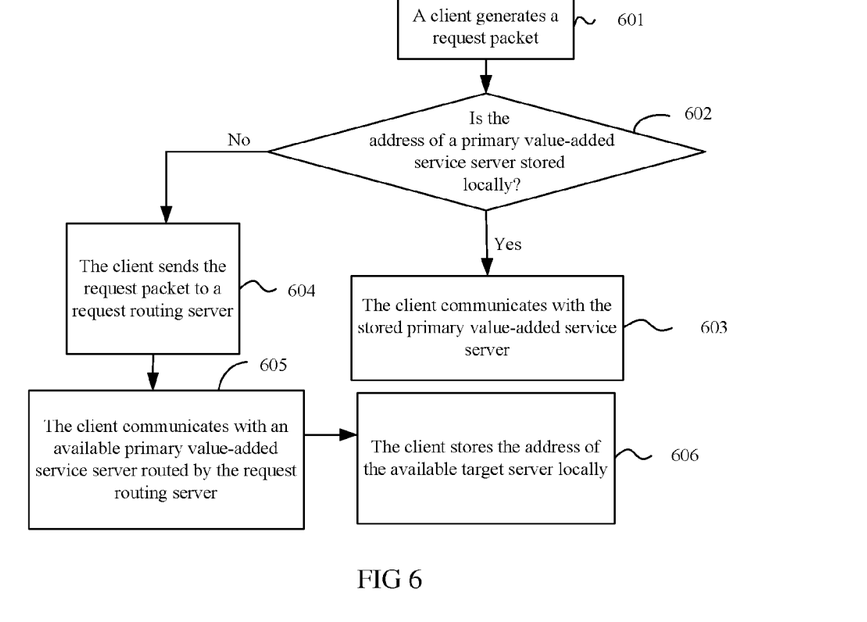
FIG. 6 is a flowchart of a method for initiating a request by a client to a primary value-added service server in the prior art.

In the prior art, a process of requesting a service by the client from the primary value-added service server is shown in FIG. 6, and includes the following steps:

When the client needs to request a video value-added service from the primary value-added service server, step 601 is executed: The client generates a request packet according to content of the requested service. Generally, the client stores the address of the routed primary value-added service server in a local memory after successfully requesting routing from the RRS for the first time. Therefore, after the request packet is generated, the client first executes step 602: The client determines whether the local memory stores the address of the primary value-added service server, and if yes, step 603 is executed: The client directly communicates with the primary value-added service server; and if the local memory does not store the address of the primary value-added service server, step 604 is executed: The client sends the request packet to the request routing server.

The request routing server routes an available primary value-added service server after receiving the request packet, and then forwards the request packet to the available primary value-added service server; next, the client executes step 605: The client communicates with the available primary value-added service server routed by the request routing server. Upon completion of the communication, the client executes step 606: Store the address of the available primary value-added service server in the local memory.

As known from the above analysis, in the prior art, upon completion of a communication process, the client records the address of the primary value-added service server, and when requesting a service next time, the client directly communicates with the recorded primary value-added service server without requiring the RRS to perform routing. After the client records the primary value-added service server and before the next communication, if the primary value-added service server fails, the client still sends the request packet to the failed primary value-added service server because the client is unable to learn the state of the primary value-added service server. This may also cause problems of a burden increase of the failed value-added service server and a non-optimal transmission path of the request packet.

Step 504 of this embodiment can solve the problem that the client still invokes the value-added service server after the value-added service server fails in the prior art.

Specifically, when the router finds that the state of the primary value-added service server in the request packet sent by the client is the failed state, the router first executes step 503: The router forwards the request packet to the RRS for rerouting or forwards the request packet to the backup value-added service server, and then executes step 504: The router sends the second failure message to the client, where the second failure message is used to instruct the client to delete the address of the primary value-added service server stored on the client. Therefore, when initiating a request next time, the client sends the request packet to the RRS because the address of the primary value-added service server is not stored locally, and the RRS routes the available primary value-added service server.

The method for packet processing during a server failure according to this embodiment is a method improved on the basis of Embodiment 1 and can overcome the disadvantages of long-time waiting of a client when the client requests a video value-added service, increased client complexity, and reduced network security, which are overcome in Embodiment 1. In addition, when the router in this embodiment receives a request packet sent by the client, if the router finds that a primary value-added service server is in a failed state, the router not only forwards the request packet according to the method described in Embodiment 1, but also sends a failure message to the client to notify the client that the primary value-added service server stored on the client fails and that it is necessary to delete the stored information about the primary value-added service server, so that the next request packet is directly sent to an RRS for routing. Therefore, problems of a burden increase of the failed value-added service server and a non-optimal transmission path of the request packet are solved.

It should be noted that the method for packet processing during a server failure according to this embodiment may further include the following step 1 and step 2, so that the method for packet processing during a server failure in this embodiment has failure feedback and recovery functions.

Step 1: The router periodically queries the locally-stored state of the primary value-added service server.

Step 2: When finding that the state of the primary value-added service server changes from a normal state to the failed state, the router sends a first failure message to the RRS; or when finding that the state of the primary value-added service server changes from the failed state to a normal state, the router sends a failure recovery message to the RRS.

The two steps are described in detail with reference to FIG. 3 in Embodiment 2, and therefore no further details are provided herein. The method for packet processing during a server failure according to this embodiment can further solve, by adding the two steps, the problems of a burden increase of the failed value-added service server and a non-optimal transmission path of the request packet, which are resulted from that the failed value-added service server is still invoked by the RRS.

In the above steps, the state of the primary value-added service server is obtained by the main control board on the router through active detection or is obtained by the main control board by receiving a state message reported by the primary value-added service server, and is stored locally by the main control board.

Certainly, the state change of the primary value-added service server from the failed state to the normal state may include but is not limited to copying, by the router, data of the backup value-added service server to the primary value-added service server.

The step of storing the state and the step of recovering from the failed state to the normal state by the primary value-added service server have been described in detail in Embodiment 2, and therefore no further details are provided herein.

Figure 7:
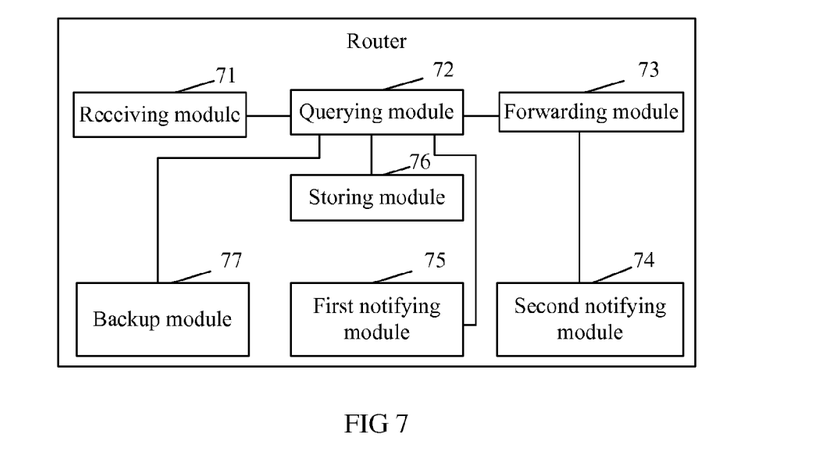
FIG. 7 is a block diagram of a router according to Embodiment 3 of the present invention.

This embodiment further provides a router. As shown in FIG. 7, the router includes: a receiving module 71, configured to receive a request packet generated when a client establishes an initial connection or requests FCC and RET, where the request packet carries information about a primary value-added service server in the router; a querying module 72, configured to query a locally-stored state of the primary value-added service server in the router according to the information about the primary value-added service server; and a forwarding module 73, configured to forward, when the state of the primary value-added service server is a failed state, the request packet to a request routing server for rerouting, where the state of the primary value-added service server is found by the querying module 72; or the forwarding module 73, configured to forward, according to a locally-stored address of a backup value-added service server, the request packet to the backup value-added service server when the state of the primary value-added service server is a failed state, where the state of the primary value-added service server is found by the querying module 72.

When the request packet received by the router is sent by the client, the router may further include: a second notifying module 74, configured to send a second failure message to the client after the request packet is forwarded to the request routing server for rerouting, or after the request packet is forwarded according to the locally-stored address of the backup value-added service server to the backup value-added service server, where the second failure message is used to instruct the client to delete the address of the primary value-added service server stored by the client.

The method executed by the above modules has been described in detail in Embodiment 1 and the above method description, and therefore no further details are provided herein.

The router provided in this embodiment is a router improved on the basis of Embodiment 1 and can overcome the disadvantages of long-time waiting of a client when the client requests a video value-added service, increased client complexity, and reduced network security, which are overcome in Embodiment 1. In addition, when the router in this embodiment receives a request packet sent by the client, if the router finds that a primary value-added service server is in a failed state, the router not only forwards the request packet through a forwarding module as described in Embodiment 1, but also sends a failure message to the client through a second notifying module to notify the client that the primary value-added service server stored on the client fails and that it is necessary to delete the stored information about the primary value-added service server, so that the next request packet is directly sent to an RRS for routing. Therefore, problems of a burden increase of the failed value-added service server and a non-optimal transmission path of the request packet are solved.

It should be noted that the querying module 72 may be further configured to periodically query the locally-stored state of the primary value-added service server in the router.

The router provided in this embodiment may further include: a first notifying module 75, configured to send a first failure message to the request routing server when the state of the primary value-added service server changes from the normal state to the failed state, where the state of the primary value-added service server is found by the querying module 72, and the first failure message is used to instruct the request routing server to change the state of the primary value-added service server stored on the request routing server to the failed state.

The first notifying module 75 may be further configured to send a failure recovery message to the request routing server when the state of the primary value-added service server changes from the failed state to the normal state, where the state of the primary value-added service server is found by the querying module 72, and the failure recovery message is used to instruct the request routing server to change the state of the primary value-added service server stored on the request routing server to the normal state.

The router may further include a storing module 76, configured to store the state of the primary value-added service server, where the state of the primary value-added service server is obtained by a main control board on the router through active detection or is obtained by the main control board by receiving a state message reported by the primary value-added service server.

The router may further include a backup module 77, configured to copy data of the backup value-added service server to the primary value-added service server, so that the state of the primary value-added service server changes from the failed state to the normal state.

The method executed by the above modules has been described in detail in Embodiment 2, and therefore no further details are provided herein. By adding the first notifying module, the router provided in this embodiment can further solve the problems of a burden increase of the failed value-added service server and a non-optimal transmission path of the request packet, which are resulted from that the failed value-added service server is still invoked by the RRS.

Through the above description of the embodiments, persons skilled in the art may clearly understand that the present invention may be implemented by software in addition to necessary universal hardware, and definitely may also be implemented by hardware. However, under most circumstances, the former is preferred. Based on such an understanding, the technical solutions of the present invention essentially, or the part contributing to the prior art may be implemented in the form of a software product. The computer software product is stored in a readable storage medium, for example, a floppy disk, a hard disk, or an optical disk of a computer, and includes several instructions for instructing a computer device (which may be a personal computer, a server, a network device, and the like) to execute the methods described in the embodiments of the present invention.

Embodiments of the present invention are mainly used on a network that provides an IPTV service.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for packet processing during a server failure, comprising:
    receiving, by a router, a request packet generated when a client establishes an initial connection or requests Fast Channel Changing (FCC) and Retransmission (RET), wherein the request packet carries information about a primary value-added service server in the router;
    querying, by the router, a locally-stored state of the primary value-added service server according to the information about the primary value-added service server; and
    when the state of the primary value-added service server is a failed state, forwarding, by the router, the request packet to a request routing server for rerouting; or
    when the state of the primary value-added service server is a failed state, forwarding, by the router according to a locally-stored address of a backup value-added service server, the request packet to the backup value-added service server, and
    when the state of the primary value-added service server changes from the failed state to a normal state, sending, by the router, a failure recovery message to the request routing server, wherein the failure recovery message is used to instruct the request routing server to change the state of the primary value-added service server stored on the request routing server to the normal state.

2. The method for packet processing during a server failure according to claim 1, further comprising:
    querying, by the router, the locally-stored state of the primary value-added service server periodically; and
    when the state of the primary value-added service server changes from the normal state to the failed state, sending, by the router, a first failure message to the request routing server, wherein the first failure message is used to instruct the request routing server to change the state of the primary value-added service server stored on the request routing server to the failed state.

3. The method for packet processing during a server failure according to claim 2, wherein the changing the state of the primary value-added service server from the failed state to the normal state comprises: copying, by the router, data of the backup value-added service server to the primary value-added service server, so that the state of the primary value-added service server changes from the failed state to the normal state.

4. The method for packet processing during a server failure according to claim 1, wherein the state of the primary value-added service server is obtained by a main control board on the router through active detection or is obtained by the main control board by receiving a state message reported by the primary value-added service server, and is stored locally by the main control board.

5. The method for packet processing during a server failure according to claim 4, wherein the request packet is sent by the client; and
    after the forwarding, by the router, the request packet to a request routing server for rerouting, or after the forwarding, by the router according to a locally-stored address of a backup value-added service server, the request packet to the backup value-added service server, further comprising:
    sending, by the router, a second failure message to the client, wherein the second failure message is used to instruct the client to delete an address of the primary value-added service server stored on the client.

6. A router, comprising:
    a main control board, comprising:
    a receiver, configured to receive a request packet generated when a client establishes an initial connection or requests Fast Channel Changing (FCC) and Retransmission (RET), wherein the request packet carries information about a primary value-added service server in the router;
    a questioner, configured to query a locally-stored state of the primary value-added service server in the router according to the information about the primary value-added service server; and
    a forwarder, configured to forward, when the state of the primary value-added service server is a failed state, the request packet to a request routing server for rerouting, wherein the state of the primary value-added service server is found by the questioner; or
    the forwarder, configured to forward, according to a locally-stored address of a backup value-added service server in the router, the request packet to the backup value-added service server when the state of the primary value-added service server is the failed state, wherein the state of the primary value-added service server is found by the questioner, and
    the first notifier, further configured to send a failure recovery message to the request routing server when the state of the primary value-added service server changes from the failed state to a normal state, wherein the state of the primary value-added service server is found by the questioner, and the failure recovery message is used to instruct the request routing server to change the state of the primary value-added service server stored on the request routing server to the normal state.

7. The router according to claim 6, wherein: the questioner is further configured to periodically query the locally-stored state of the primary value-added service server in the router; and
    the router further comprising: a first notifier, configured to send a first failure message to the request routing server when the state of the primary value-added service server changes from the normal state to the failed state, wherein the state of the primary value-added service server is found by the questioner, and the first failure message is used to instruct the request routing server to change the state of the primary value-added service server stored on the request routing server to the failed state; or
    the first notifier, further configured to send a failure recovery message to the request routing server when the state of the primary value-added service server changes from the failed state to a normal state, wherein the state of the primary value-added service server is found by the questioner, and the failure recovery message is used to instruct the request routing server to change the state of the primary value-added service server stored on the request routing server to the normal state.

8. The router according to claim 7, further comprising: a backup, configured to copy data of the backup value-added service server to the primary value-added service server, so that the state of the primary value-added service server changes from the failed state to the normal state.

9. The router according to claim 6, further comprising:
    a storage, configured to store the state of the primary value-added service server, wherein the state of the primary value-added service server is obtained by a main control board on the router through active detection or is obtained by the main control board by receiving a state message reported by the primary value-added service server.

10. The router according to claim 9, wherein: the request packet is sent by the client; and the router further comprises a second notifier, configured to send a second failure message to the client after the request packet is forwarded to the request routing server for rerouting, or after the request packet is forwarded according to the locally-stored address of the backup value-added service server to the backup value-added service server, wherein the second failure message is used to instruct the client to delete an address of the primary value-added service server stored on the client.

11. An apparatus comprising:

a router comprising a main control board and configured to receive a request packet generated when a client establishes an initial connection or requests Fast Channel Changing (FCC) and Retransmission (RET), wherein the request packet carries information about a primary value-added service server in the router, to query a locally-stored state of the primary value-added service server in the router according to the information about the primary value-added service server, and to forward, when the state of the primary value-added service server is a failed state, the request packet to a request routing server for rerouting, wherein the state of the primary value-added service server is found by the router, or to forward, according to a locally-stored address of a backup value-added service server in the router, the request packet to the backup value-added service server when the state of the primary value-added service server is the failed state, wherein the state of the primary value-added service server is found by the router, and when the state of the primary value-added service server changes from the failed state to a normal state, sending, by the router, a failure recovery message to the request routing server, wherein the failure recovery message is used to instruct the request routing server to change the state of the primary value-added service server stored on the request routing server to the normal state.

* * * * *